United States Patent

Hall et al.

[15] 3,676,848

[45] July 11, 1972

[54] MACHINE RECOGNITION OF SYMBOLS

[72] Inventors: Ronald Edward Hall, Denver; Larry Norman Hulbert, Littleton, both of Colo.

[73] Assignee: Ferroxcube Corporation, Saugerties, N.Y.

[22] Filed: Oct. 13, 1970

[21] Appl. No.: 80,261

[52] U.S. Cl. ....................340/146.3 AC

[51] Int. Cl. ....................G06k 9/00

[58] Field of Search ..........340/146.3 AC, 146.3 SG, 146.3 J, 340/146.3 R; 178/18, 19, 20; 235/197, 61.6 A

[56] References Cited

UNITED STATES PATENTS

| | | | |
|---|---|---|---|
| 3,297,993 | 1/1967 | Clapper | 340/146.3 J |
| 3,199,078 | 8/1965 | Gaffney, Jr. et al. | 340/146.3 J |
| 3,111,646 | 11/1963 | Harmon | 340/146.3 SG |

*Primary Examiner*—Thomas A. Robinson
*Attorney*—Frank R. Trifari

[57] ABSTRACT

Character recognition system employing zone and direction encoding and decoding to recognize hand drawn real-time characters.

6 Claims, 6 Drawing Figures

*INVENTORS.*
RONALD E. HALL
LARRY N. HULBERT
*BY* [signature]
AGENT

INVENTORS.
RONALD E. HALL
LARRY N. HULBERT
BY
AGENT

INVENTORS.
RONALD E. HALL
LARRY N. HULBERT
BY
AGENT

MACHINE RECOGNITION OF SYMBOLS

This invention relates to a character recognition system, and particularly to a character recognition system for coding and decoding symbol positions on a zone and directional basis in real time.

Conventional devices for alphanumeric character and other symbol recognition employ scanning techniques on a line by line scan or on a quantization system. In either case a series of coded signal representations are formed from a pre-existing symbol for subsequent storage and decoding. In either of these systems, the resolution will depend on the tightness of beam, the deviation of the symbol from a fixed or prescribed norm, and ambient conditions. Other types of systems employing conductive or magnetic inks also rely upon prescribed symbol definitions, ambient conditions, and are limited by resolution requirements in terms of size and packing densities. Varieties of systems employing zone recognition are cumbersome in that such systems require large scale logic circuitry necessary to uniquely identify each zone as selected.

There remains a need for a system that will recognize real time, hand drawn characters without the use of beam scan equipment, special inks or reliance upon favorable ambient conditions, while still providing digital or computer usable form of output.

It is accordingly the primary object of this invention to provide a novel and unique system of recognizing alphanumeric characters and other symbols.

It is a further object of this invention to provide a novel and unique system of recognizing alphanumeric characters and other symbols in real time.

It is a still further object of this invention to provide a novel and unique system of recognizing alphanumeric characters and other symbols in real time and providing an output in digital form.

The foregoing objects are accomplished by the provision of a system having a multizone surface for providing digital signals indicative of the generated presence of a symbol in each zone, as well as a signal indicating the direction of the symbol from an original zone to a next and following successive zones. The system includes a plurality of prestored symbols in digital form and selection of the proper symbol from a storage medium in effected accordance with the digital sequence corresponding to the generated symbol.

Other objects and advantages will become apparent with reference to the accompanying specification and drawings illustrating a preferred embodiment of the invention wherein.

Figure 6:
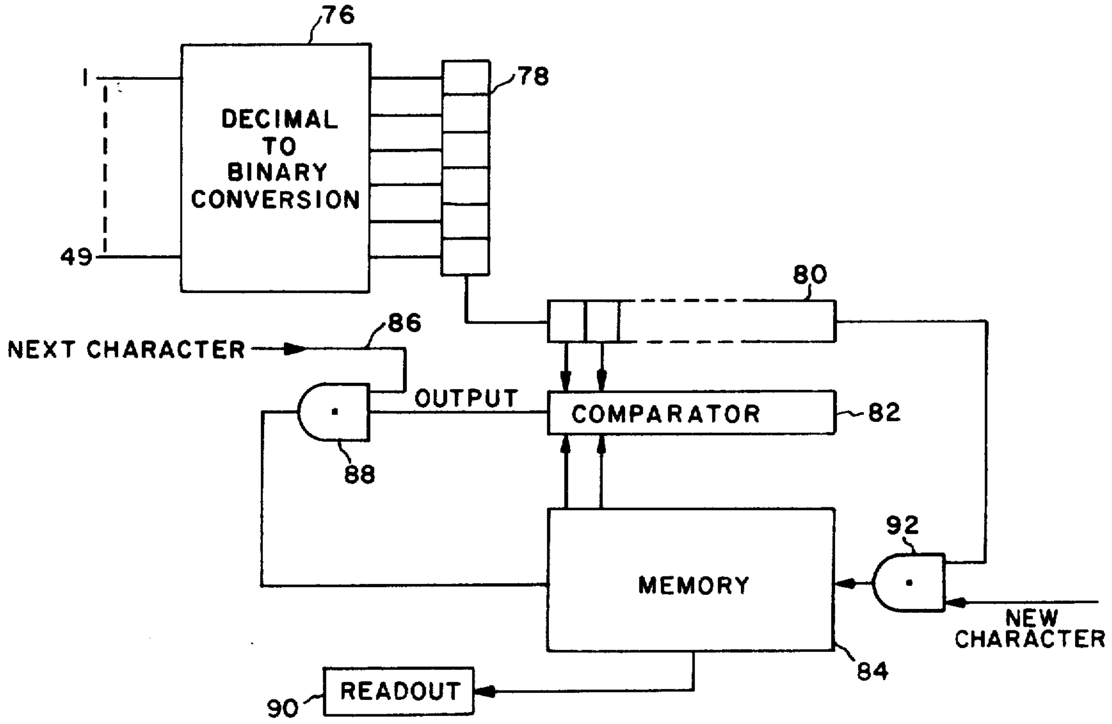

FIG. 6 the register read out for character selection.

Referring to the drawings, a data surface 10 designed to respond to surface energization is coupled to a digitizing circuit 12 responding to the local coordinate energization for providing a digital representation of the planar energizing location on the surface 10. The digital symbol is translated in block 14 into a digital equivalent representative of the symbol generated.

The digital representation is coupled in unit 16 with symbols prestored on a digital basis and the appropriate symbol selected. A suitable readout unit 18 responds to the selected character and provides a graphic or electrical display as desired.

The data surface 10 is divided into a plurality of areas, each of a size suitable to accommodate a symbol such as a character on a hand-written basis. Each of the areas is divided into a plurality of zones, shown in FIG. 2. The zones are each numbered 1, 2, 3, 4, 5, 6, 7, 8, 9 and correspond to digitizing locations on the surface. Various means of surface digitizing are usable. For example, a coordinate matrix of wires can underlie the surface area, coordinate selection being effected by means of direct pressure. Another means of generating digital coordinates on the surface 10 is by means of sonic generation on or about the surface 10 and picked up by means of tranducers located at the edges of the surface. Such a device is illustrated in U.S. Pat. Nos. 3,134,099 and 3,156,766; and a commercially available device as advertised in "Electronics," Dec. 22, 1969, pages 151–152.

Figure 2:
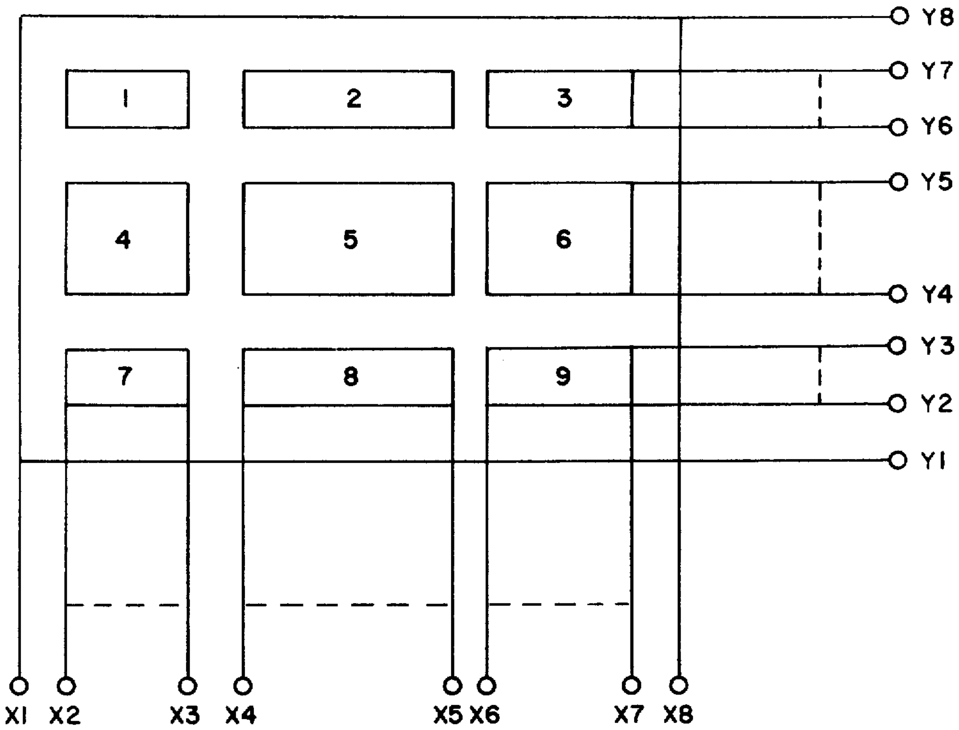
FIG. 2 illustrates the surface zoning and coordinate select organization of a data surface.

Each of the zones 1–9 in FIG. 2 will, when energized, provide a digital coordinate indicative of the particular area contacted. Thus, energization of area 1 will provide generation of a coordinate ($X_2 - X_3$, $Y_7 - Y_8$ ). Similarly, consecutive zone generation such as 1–2 will result in the generation of a coordinate ($X_3 - X_4$, $Y_7 - Y_8$ ). As the character is entered upon an area, a sequence of digitization coordinates will be generated in the order of the successive zones occupied by the character as it is entered in an area.

The degree of coordinate selection available is limited only by the desired resolution required or possible. Thus, although the nine zone areas shown in FIG. 2 is sufficient to identify a great number of different variations of alphanumeric symbols and characters, higher numbers of zones per character area are possible. As shown, the zones are configured to take advantage of normal character patterns. Thus, the zones 1, 3, 7 and 9 are rectangular in shape, zones 4 and 6 are square with vertical elongation between zones 1 and 7 and 3 and 9 respectively, zones 2 and 8 are rectangular with horizontal elongation between zones 1 and 3 and 7 and 9 respectively, and zone 5 is square and centrally located with both vertical and horizontal elongation.

Figure 1:
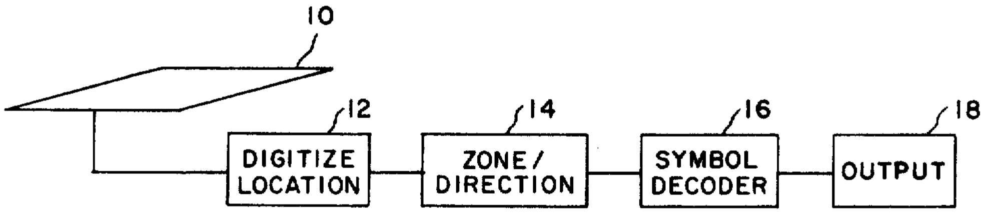
FIG. 1 illustrates a block diagram of the overall system embodying the invention.
Figure 3:
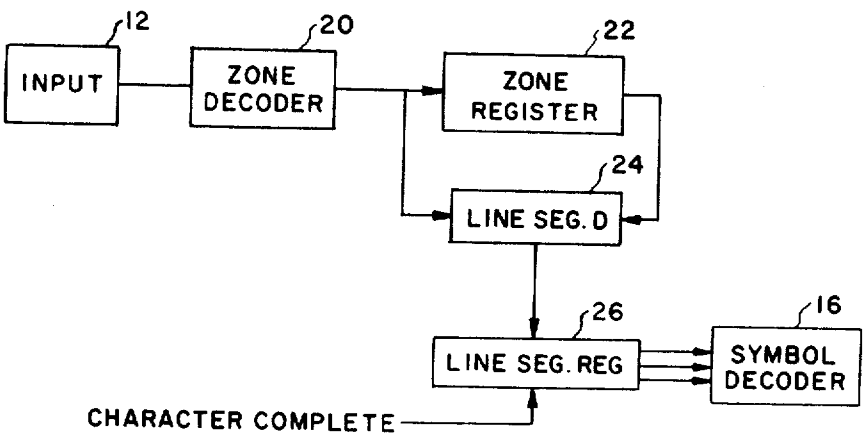
FIG. 3 is a block diagram of the line and zone coding and decoding system.
Figure 4:
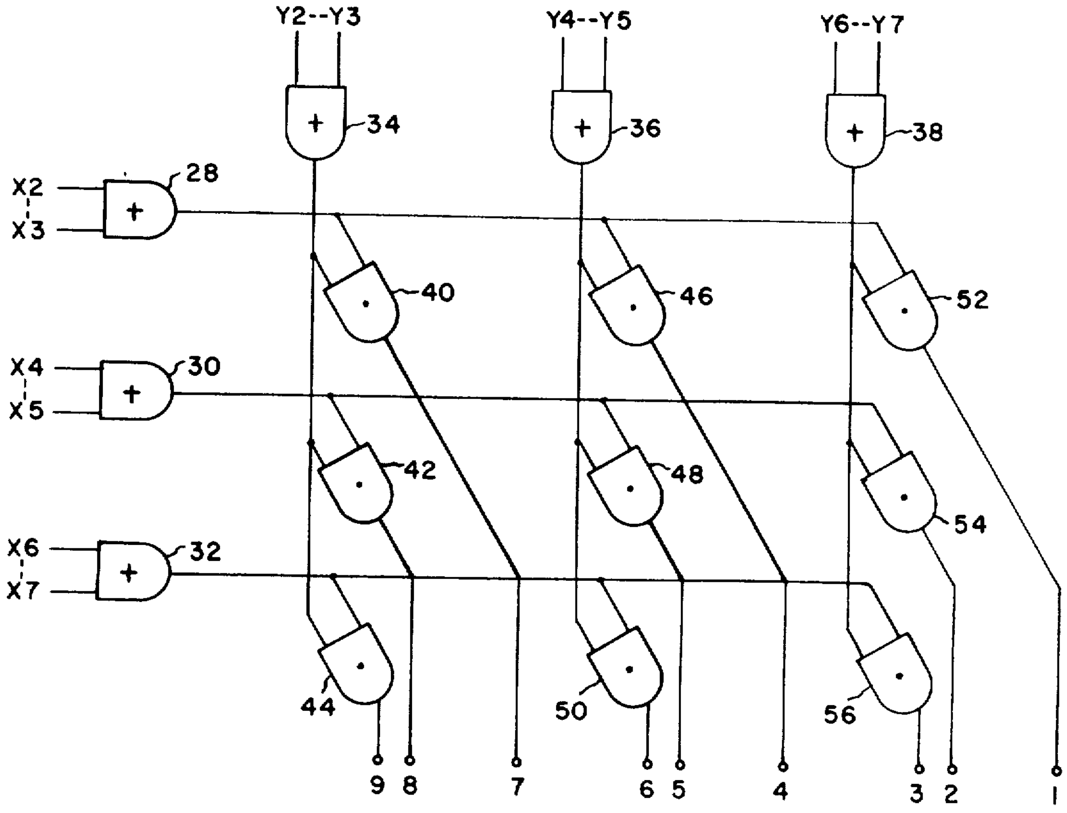
FIG. 4 illustrates schematically the matrix coding zone selection.

Referring to FIG. 3, a general block diagram of a preferred embodiment of a zone/direction symbol generator is shown. As shown in FIG. 1 the zone/direction generator 14 receives coordinate digitization location information from a digitizer 12 and transmits an output to a symbol decoder 16. In accordance with the invention, the symbol generator 14 must supply output data indicating both a coordinate location and a coordinate direction. The input unit 12 provides digitizing information regarding a zone selection. This information is decoded into binary or equivalent form in a zone decoder 20 for providing a zone information signal identifying the zone. The zone information signal is fed to a zone register 22 for storage. The next subsequent line segment creates a second coordinate location indication through unit 20. The line segment detector 24 receives the latter quantum of information and compares the new zone with the zone previously stored in the zone register 22. The line segment detector 24 then generates an output as a coded sequence of information indicating both position (identity) of the selected zones and the direction of the zone to zone relationship. The line segment detector 24 output is supplied to a line segment register 26 for interim storage. Each subsequent zone selection within an area is similarly coded and stored in the line segment register 26. When the character is completed within an area, an indication is provided to the line segment register and the totality of information concerning the formation of the character is read out of the line segment register into a symbol decoding unit 16. Read out of the line segment register is accomplished by keying an indication of the beginning of a new character in a separate zone area. The new character is coded and decoded in the same set of registers as the previous character. One preferred embodiment of the zone decoding mechanism 20 of FIG. 3, used for decoding zone coordinate information, is illustrated in FIG. 4. The coordinate information is entered into the corresponding OR gate 28, 30, 32 for X coordinate data, and into the corresponding OR gate 34, 36, 38 for corresponding Y coordinate data. Each intersecting data point in the matrix is locatable by means of a corresponding AND gate 40, 42, 44, 46, 48, 50, 52, 54, 56. The matrix encoder shown in FIG. 4 corresponds to the surface zoning arrangement of FIG. 2. Thus, energization of zone 1 in FIG. 2, producing coordinates $X_2$ $X_3$ – $Y_6$ $Y_7$ will energize through OR gates 28 and 38, the AND gate 52, thereby producing a zone 1 output. Thus, the nine zone areas as shown in FIG. 2 are decodable into a digital indication of positions. Positions such as inter-zone areas and terminators need not be coded since the zone areas can provide sufficient recognition information to a satisfactory degree of resolution. In further embodiments however, where greater degrees of resolution are desired, additional decodable coordinate information segments can be provided.

Figure 5:
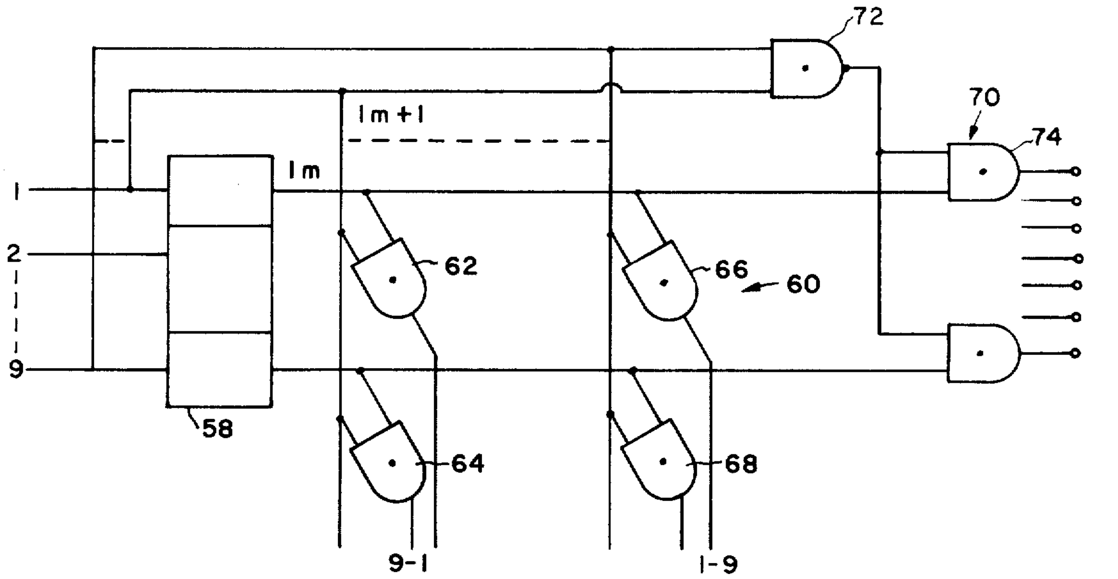
FIG. 5 shows the matrix decoding concept of the invention.

The zone register 22 and line segment decoder 24 functions are mechanized by means of the preferred embodiment shown in FIG. 5. The decoded zone information derived from the circuit of FIG. 4 is placed in parallel fashion into a zone register 58. The line segment decoder is in matrix gate form, illustrated generally as 60 and including a plurality of AND gates 62, 64, 66, 68 each coupled to the input and output of a register stage. Thus, in operation, a first set of zone information data entered by a line segment $1_n$ (one out of nine) in this example) appears at the input of the register 58 and sets a corresponding stage accordingly, thereby energizing the horizontal set of conductors in matrix 60. Entry of the second set of data $1_n + 1$ representing the next successive zone entered by line continuation or a further line segment on the data surface enables one of the AND gates of the matrix 60 by corresponding energization of one of the vertical set of conductors of the matrix 60. For example, successive energization of zones 1 and 9 will cause enabling of gate 66, while the successive energization of zones 9 and 1 (the reverse) will cause enabling of gate 64. Thus, directional as well as zonal information is generated.

The actual number of output lines presented by the matrix 60 is a function of the number of possible or probable combinations of zones. It should be noted that the possibility of a degenerate line segment can occur. A degenerate line segment is one in which no subsequent zone registration occurs, or in other words, a single zone line. Examples include a dash or a dot, or merely a character having a dot such as the letter "*i*." A degenerate line segment can be detected by providing the matrix with a supplemental AND gate line 70 coupled to each of the register 58 output lines $1_n$. A NAND gate 72 is coupled to each $1_n + 1$ line and will couple a degenerate line segment indication through the appropriate one of AND gate line 70. For example, a zone indication of 1 will set the upper stage of the register 58. Failure of a second zone to present itself will result in blocking all gates in the matrix 60, but will place an output at gate 72, thereby enabling the first gate 74 of gate line 70, thus providing an indication of the presence of a degenerate line segment in the zone 1. Read out cycling is maintained by clock pulse timing of conventional format, and is not shown for ease of illustration.

Returning to the possible number of decoder matrix output lines, the maximum number of zone pairs based upon the exemplary nine zone configuration of FIG. 2 is 72. Adding to that the nine lines for degenerate line segments, the maximum total output is 81 lines. Although this is feasible, it is possible with the use of conventional graphics involving alphanumerics to reduce the zone pair possibilities to a probable maximum of 20, or 40 output lines plus nine lines for degenerate line segments. The elimination of non-essential or non-likely zone pairs accounts for the reduction. For example, using the nine zone configuration, the likely pair combinations include horizontal rows (six pairs: 1, 2; 2, 3; 4, 5; 5, 6; 7, 8; 8, 9) vertical columns ( six pairs: 1,4; 4,7; 2,5; 5, 8; 3, 6; 6, 9 ) left diagonals ( four pairs: 4, 8; 1, 5; 5, 9; 2, 6 ), and right diagonals (four pairs: 2, 4; 3, 5; 5, 7; 6, 8).

The output lines of the decoding matrix will thus define a character in totality by a series of sequentially provided outputs along individual lines on a one out of X basis. The letter X in the example given above is representative of the total number of output lines, 49. The information provided is thus stored in a line segment register 26.

Referring to FIG. 6 , a preferred embodiment of a logic network for symbol decoding is illustrated. In conformity with the foregoing example of FIG. 5, the decoder employs a 49 input line decimal to binary converter 76 for conversion of the successive one out of 49 input sequences to a corresponding binary digit group. In the one out of 49 sequence, a digit grouping of six binary bits is sufficient for each line segment. The converter 76 may be of conventional design. Example of such systems are shown in U.S. Pat. Nos. 3,084,860 and 3,087,149. Each line segment is placed in parallel fashion into register 78 and read out sequentially, under the influence of conventional timing circuitry (not shown), and fed serially into register 80. The process continues until a complete character has been digitized. A comparator 82 continuously compares the data stored in register 80 with a memory 84 for identification by comparison with previously stored character. Character readout occurs upon beginning of a new character as indicated along line 86 thereby opening gate 88 and permitting the character recognition indicator to generate a signal to readout unit 90 which can print or store or perform any desired operation upon said character. Should the character not be recognized, gate 92 can be energized to place the new character word directly from register 80 into a new character memory location, thereby permitting future identification of the same character.

The comparator unit 82 is not essential and may be eliminated and the data fed directly to the memory 84. In this case, the data itself includes a read-restore pulse at the end of the character. The comparison takes place within the memory until the character ends, at which time the read-restore pulse effects a read-out of the stored character to the read-out unit 90 wherein appropriate conversion can be made to generate the character as desired, e.g., print out, visual, etc.

It will be recognized that other variations in structure usable to effect the concept of this invention can be implemented. For example, the binary to decimal conversion and all registers can form a physical portion of the main memory unit itself, using the storage medium as a register would be used, and shifting the contents in and out of memory in the desired sequence. Similarly, the gating and comparison circuitry can be effected by proper and evident use of the main memory in sequences accomplishing the functions stated above.

Other variations and modifications are clearly encompassed within the inventive scope and although certain embodiments and descriptions have been provided, it is to be understood that various further modifications, omissions and refinements which depart from the disclosed exemplary embodiments may be adopted without departing from the spirit or scope of the invention.

What is claimed:

1. A character recognition system comprising a data surface divided into a plurality of areas, each of said areas accomodating a character and divided into a plurality of zones corresponding to digitizing locations on said surface, each of said zones dimensioned in accordance with normal character patterns, first means coupled to said data surface for providing a series of digitized coordinates representative of the successive zones occupied by the various portions of a character as it is entered on an area, second means coupled to said first means and responsive to a first digitized coordinate and the next successive second digitized coordinate to provide an output data indicating both coordinate location of and direction between successive zones entered by a character, third means connected to said second means for storing said output data, fourth means containing a storage of a plurality of characters, fifth means comparing said second means output data to said prestored character data and providing a readout of said character upon recognition thereof.

2. The combination of claim 1 wherein said second means comprises a zone decoder responsive to each said digitizing signal for providing successive zone information signals for identifying each successive zone, a zone register coupled to said zone decoder for storing the first of the successive zone information signals, a line segment detector coupled to said zone decoder for storing the next successive zone information signal, and means coupling said line segment detector to said zone register for comparing the new zone with the prior zone and providing said output data indicating position and direction of the first and next successive zone.

3. The combination of claim 2 wherein said zone decoder includes a multistage register having as many stages as there are zones and a matrix of gates having one set of inputs coupled to the respective stage outputs of said multistage register for providing said first of the successive zone information signals, and a further set of inputs connected to the respective stage inputs of said multistage register for providing said next successive zone information signal.

4. The combination of claim 3 wherein degenerate line segments are decoded by means of a first NAND gate having a plurality of inputs respectively coupled to each input of said multistage register, and a plurality of NAND gates each having one input connected to the output of said first NAND gate, and each having a second input respectively connected to an output stage of said multistage register, the outputs of each of said plurality of NAND gates indicative of the presence of a degenerate line segment in respective ones of said zones.

5. A recognition system for recognizing characters defined by continuous line segments, comprising a data surface divided into a plurality of character accomodating areas, each of said areas being divided into a plurality of zones, each zone dimensioned in accordance with normal character patterns, means for generating a successive composite of digital data signals indicating the presence of a line segment of a character in each one of said zones and the direction of said line segment from each occupied zone to the next successive zone occupied by said character, means for prestoring a plurality of successive composite signals representative of a range of characters, means responsive to said successive composite signal for comparing said successive composite signal to said plurality of prestored successive composite signals representative of a range of characters, and means for reading out the character corresponding to the successive composite signal generated by said character.

6. The combination of claim 5, wherein said means for generating includes means providing a plurality of outputs along a plurality of X lines on a one out of X basis representing successive zone selection, and decoding means coupled to said plurality of outputs and responsive to successive one out of X outputs for generating a binary group representing said composite signal.

* * * * *